United States Patent [19]
Jerwick

[11] Patent Number: 6,082,215
[45] Date of Patent: Jul. 4, 2000

[54] SINGLE RAIL TOP COVER ASSEMBLY

[75] Inventor: John J. Jerwick, Southern Pines, N.C.

[73] Assignee: ZF Meritor, Laurinburg, N.C.

[21] Appl. No.: 09/141,805

[22] Filed: Aug. 28, 1998

[51] Int. Cl.[7] .............................. B60K 20/00; G05G 5/08
[52] U.S. Cl. ..................................... 74/473.25; 74/473.26; 74/473.35; 74/473.37; 74/335
[58] Field of Search ............................ 74/471 R, 473.12, 74/473.19, 473.21, 473.25, 473.26, 473.28, 473.35, 473.37, 745, 335; 192/3.56, 3.63

[56] References Cited

U.S. PATENT DOCUMENTS

| | | | |
|---|---|---|---|
| 1,373,819 | 4/1921 | Jensen | 74/477 |
| 2,654,268 | 10/1953 | Perkins . | |
| 3,452,614 | 7/1969 | Conkle | 74/477 |
| 3,513,717 | 5/1970 | Lickey et al. | 74/477 |
| 3,939,722 | 2/1976 | Stromberg . | |
| 3,962,930 | 6/1976 | Frazee | 74/473 R |
| 4,222,281 | 9/1980 | Mylenek | 74/339 |
| 4,320,670 | 3/1982 | Kawamoto | 74/477 |
| 4,503,727 | 3/1985 | Ballendux | 74/477 |
| 4,532,823 | 8/1985 | Razzacki | 74/473 R |
| 4,621,537 | 11/1986 | Piazza et al. | 74/477 |
| 4,726,250 | 2/1988 | Reed, Jr. | 74/477 |
| 4,892,001 | 1/1990 | Meyers et al. | 74/477 |
| 4,920,815 | 5/1990 | Reynolds | 74/335 |
| 5,172,603 | 12/1992 | MacInnis | 74/335 |
| 5,271,291 | 12/1993 | Knape | 74/477 |
| 5,309,785 | 5/1994 | Knape | 74/477 |
| 5,394,765 | 3/1995 | Ono et al. | 74/477 |
| 5,562,011 | 10/1996 | Bartus | 74/473 R |
| 5,673,592 | 10/1997 | Huggins et al. | 74/336 R |
| 5,687,615 | 11/1997 | Takemura et al. | 74/475 |
| 5,737,969 | 4/1998 | Brown et al. | 74/477 |
| 5,931,055 | 8/1999 | Huber et al. | 74/745 |

FOREIGN PATENT DOCUMENTS

| | | |
|---|---|---|
| 0395241 | 4/1990 | European Pat. Off. . |
| 0651183 | 11/1994 | European Pat. Off. . |
| 0800027 | 10/1997 | European Pat. Off. . |
| 0926400 | 12/1998 | European Pat. Off. . |

OTHER PUBLICATIONS

"New Concept Eaton Fuller 10 Speed Transmission Family"; Ronald Hutchinson and Dwight Simpson; International Truck & Bus Meeting & Exposition, Winston–Salem, North Carolina, Nov. 13–15, 1995.

*Primary Examiner*—David M. Fenstermacher
*Attorney, Agent, or Firm*—Howard & Howard

[57] ABSTRACT

A top cover assembly for a manual transmission having a plurality of gears and a reverse gear is provided. The top cover assembly comprises a shift rail assembly, a reverse biasing assembly, and a shift housing assembly. The shift rail assembly includes a sensing device that interacts with a contoured surface for producing a first electronic signal in response to the shift rail being in a neutral position for range shifting. Another contoured surface acts to center the shift rail and an operatively connected shift lever. For reverse biasing, the shift lever has a first lower shift force when moved to shift at least one of the forward gears. An interlock supported by the shift rail and shift sleeve rotates with the shift rail and acts to lock out other gears during a gear shift. In one aspect of the invention, the interlock is also used for reverse biasing. A detent engages the interlock for creating a higher shift force than the first lower shift force when the shift lever is moved to shift the reverse gear. Additionally, a shift housing assembly comprises a shift housing having a channel and a shift fork for engaging the plurality of gears. A shift bar interconnects the shift lever and the shift fork and slidingly engages the channel such that when the shift lever and shift sleeve actuates the shift bar, said shift bar moves along the channel causing the shift fork to engage and shift into a desired gear.

20 Claims, 10 Drawing Sheets

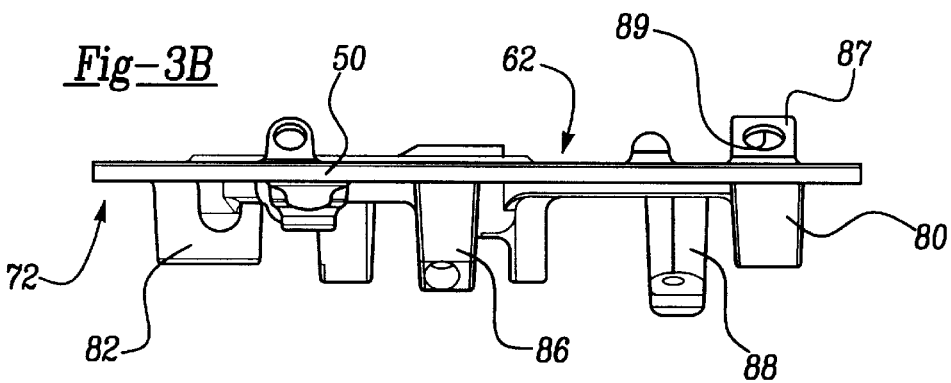
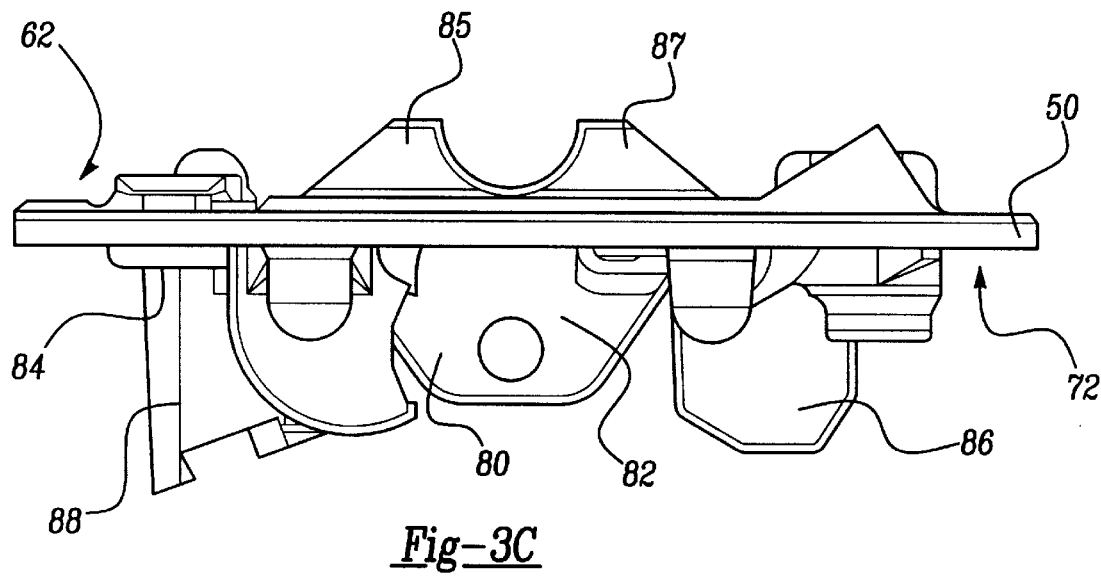

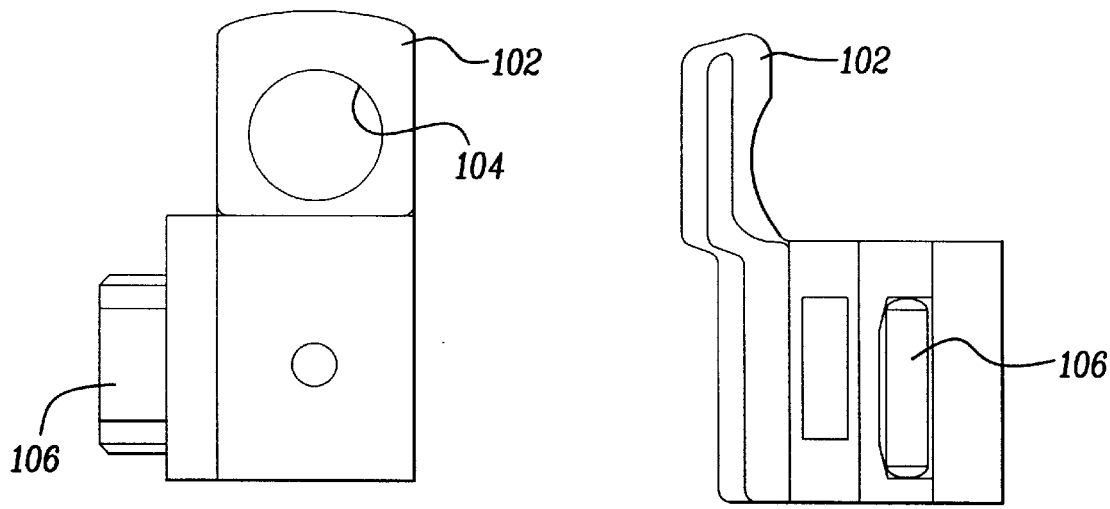
*Fig-4A*  *Fig-4B*
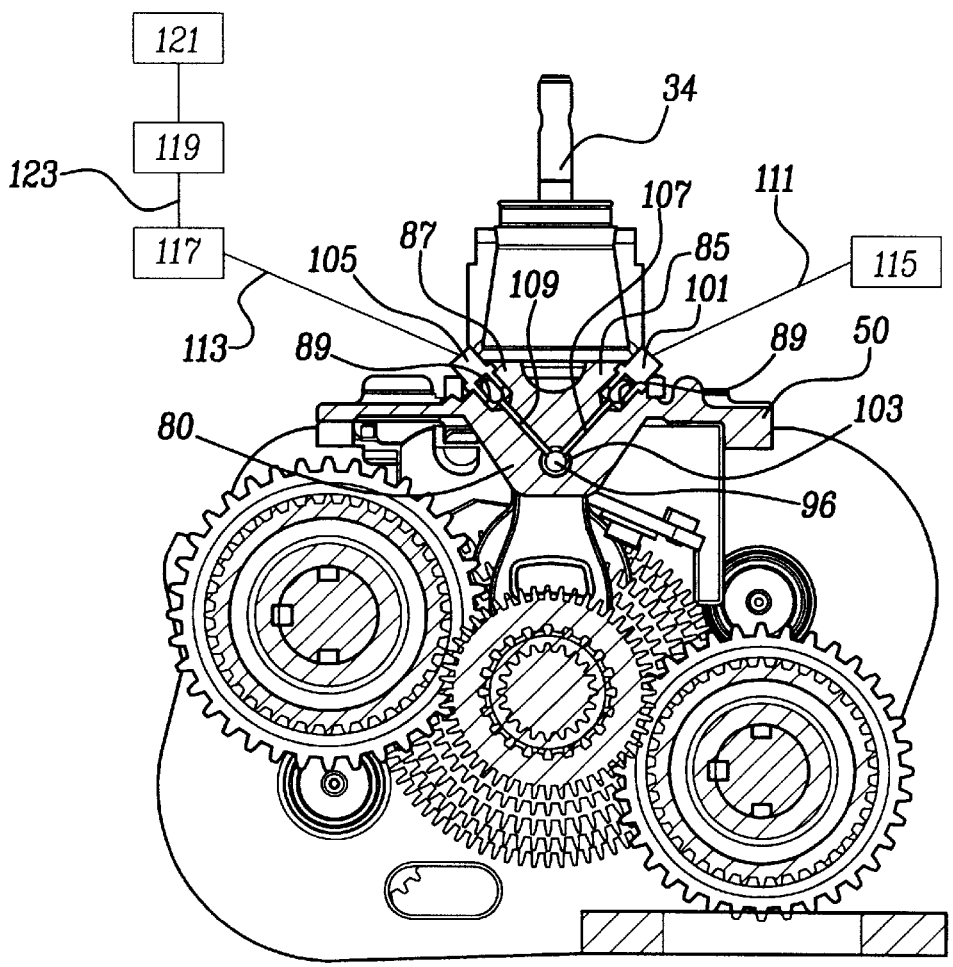
*Fig-5*

SINGLE RAIL TOP COVER ASSEMBLY

BACKGROUND OF THE INVENTION

This invention relates to a manual range-type transmission that incorporates a top cover assembly having a single shift rail, reverse bias, and shift housing.

Much effort is expended on designing transmissions that increases robustness and reliability while making the transmission easier to assemble and service. Manual transmissions incorporate many separate, non-integrated systems to achieve these ends.

In a manual range-type transmission for heavy duty trucks there is a set of gears in a main transmission section and a set of range gears that are actuated selectively to put the main transmission gears in either low or high range. After shifting through the main gears in low range, the operator may range shift to make available the main gears in high range, or visa versa. In this manner, the number of gears available to the vehicle operator is effectively doubled.

For the range gears to operate properly it is desirable that the transmission be in neutral (none of the main gears engaged) when a range shift occurs. Some prior art systems incorporate a three shift rail assembly that includes a check shaft that locks out the range gears when the main gears are not in neutral. However, these systems increase the shift effort necessary by the operator and still permits undesired range shifting in some instances.

Many manual transmissions for heavy duty truck applications do not have shift levers that automatically return to the neutral position when moved out of gear. The problem is that after the vehicle operator has moved the shift lever out of gear there is no feed back in the shift lever to indicated to the operator where he is in the shift pattern.

Further, manual transmissions may incorporate reverse biasing to indicate to the vehicle operator that the reverse gear is about to be engaged. This information is conveyed to the operator by a reverse biasing mechanism that increases resistance as the shift lever is moved in a horizontal direction towards a reverse gear position. Thus, while gear shifting the operator is alerted as to when the reverse gear is being approached. The operator can avoid inadvertently shifting into the reverse gear. Prior art systems incorporate additional components to achieve reverse biasing.

Moreover, manual transmissions include shift forks that are operatively connected to the shift lever. As the shift lever is moved throughout the shift pattern, a shift fork is selectively engaged and moves a clutch collar into engagement with a gear thereby causing a gear shift. The shift forks are often supported by the shift rail and typically include many fasteners and other components to attach the shift forks to the shift lever. These additional fasteners and components can make the transmission more difficult to shift and to manufacture and repair.

Therefore, what is needed is an assembly that integrates these functions into one conveniently manufactured and repairable assembly while still maintaining a reliable and durable transmission having an acceptable shift feel.

SUMMARY OF THE INVENTION

The present invention provides a top cover assembly for a manual transmission having a plurality of gears including a reverse gear. The top cover assembly comprises a shift rail assembly, a reverse biasing assembly, and a shift housing assembly. The shift rail assembly includes a housing, and a shift rail that defines a longitudinal axis and is supported by the housing. The shift rail moves axially between a plurality of shift positions for selectively placing one of the gears in driving engagement. The shift rail assembly further includes a contoured surface and a sensing device for coacting with the contoured surface producing a first electronic signal in response to the shift rail being in a predetermined shift position.

The shift rail also includes another contoured surface and a detent pin for coacting with the contoured surface that acts to rotationally center the shift rail and an operatively connected shift lever to predetermined positions.

The reverse biasing assembly comprises a shift sleeve and shift lever for shifting the gears. The shift lever has a first lower shift force when moved to shift at least one of the forward gears. The reverse biasing assembly also utilizes the shift rail of the shift rail assembly and is operatively connected to the shift sleeve and shift lever. The shift rail rotates about the longitudinal axis when the shift lever is moved to shift the gears. An interlock supported by the shift rail and shift sleeve rotates with the shift rail. A detent engages the interlock for creating a higher shift force than the first lower shift force when the shift lever is moved to shift the reverse gear.

The shift housing assembly shares the use of the shift sleeve and shift lever. The shift housing assembly comprises a shift housing having a channel and a shift fork for engaging the plurality of gears. The shift fork is selectively engageable by the shift sleeve and shift lever. A shift bar interconnects the shift sleeve and the shift fork and slidingly engages the channel such that when the shift lever actuates the shift sleeve and, in turn, the shift bar, the shift bar moves along the channel causing the shift fork to engage and shift into a desired gear.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3B is a side view of the top cover shown in FIG. 3A;

FIG. 3C is a rear view of the top cover shown in FIG. 3A;

FIG. 4A is a bottom view of the shift sleeve shown in FIG. 2;

FIG. 4B is side view of the shift sleeve shown in FIG. 4A;

FIG. 5 is a cross-sectional view taken along line 5—5 of FIG. 1 showing a neutral switch;

DETAILED DESCRIPTION OF THE PREFERRED EMBODIMENT

Figure 1:
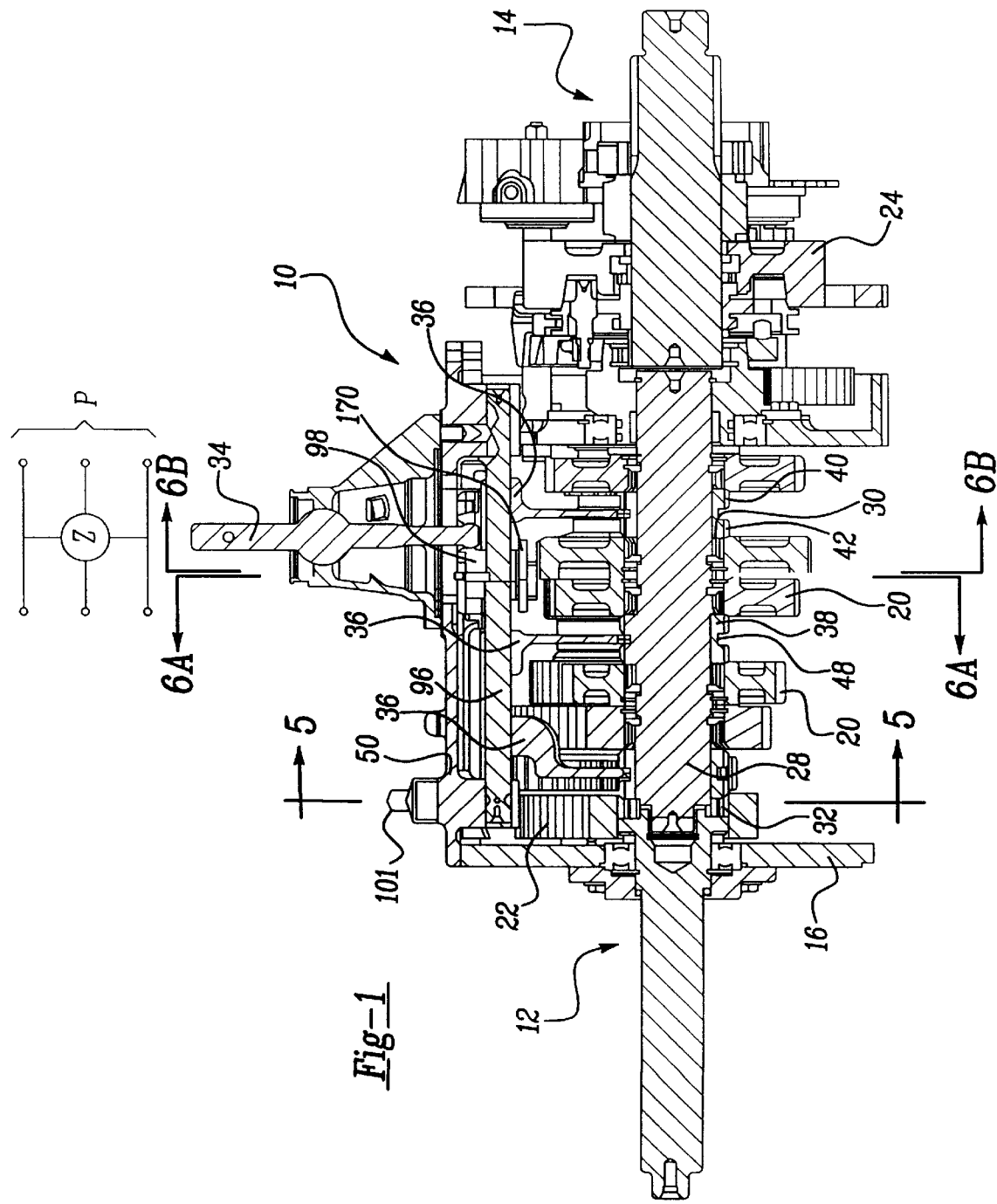
FIG. 1 is a cross-sectional view of a manual transmission with a range section.

A range-type manual transmission for a heavy duty truck having a shift pattern P is generally shown at 10 in FIG. 1. The transmission 10 has a forward 12 and rearward 14 end. The forward end 12 is coupled to a clutch that is in turn coupled to an engine. The rearward end 14 is couple to a drive shaft that is in turn coupled to a drive axle. When the clutch is manually engaged by a vehicle operator the engine becomes coupled to the transmission and the rotational motion produced by the engine is transmitted through the transmission and drive shaft to the drive axle thereby propelling the vehicle.

The transmission includes a case 16 that houses main gears 20, countershaft gears 22, and range gears 24 that, in combination, provide a low and high range and reverse gears. The main gears 20 are supported on a main shaft 28 and include an inner diameter 30 having spline teeth 32. The transmission 10 further includes a shift lever 34, shift forks 36, and clutch collars 38 that are splined to the main shaft 28. The clutch collars 38 include an outer diameter 40 having teeth 42 that selectively engage teeth 32 of the inner diameter 30 of the main gears 20. An annular groove 48 is circumscribed about the outer diameter 40 and receives the shift fork 36.

The shift lever 34 is operatively connected to the shift fork 36 such that when the shift lever 34 is moved through the shift pattern P the shift forks 36 are moved forward and rearward causing the clutch collars 38 to move forward or rearward. As a clutch collar 38 is moved from a central or neutral position on the main shaft 28, the outer diameter 40 of the clutch collar 38 engages the inner diameter 30 of a gear 20 causing a gear shift.

A top cover 50 serves as a support for the transmission components necessary to move the clutch collars 38 and effectuate a gear shift. The top cover 50 is fastened to the transmission case 16 and provides easy access to transmission components that may require service. The top cover 50 and the components it supports form a top cover assembly, best shown at 60 in FIG. 2. The top cover assembly 60 defines the shift pattern P and provides a shift feel to the vehicle operator. Further, the top cover assembly 60 insures that gear shifts occur in a proper manner.

Figure 3A:
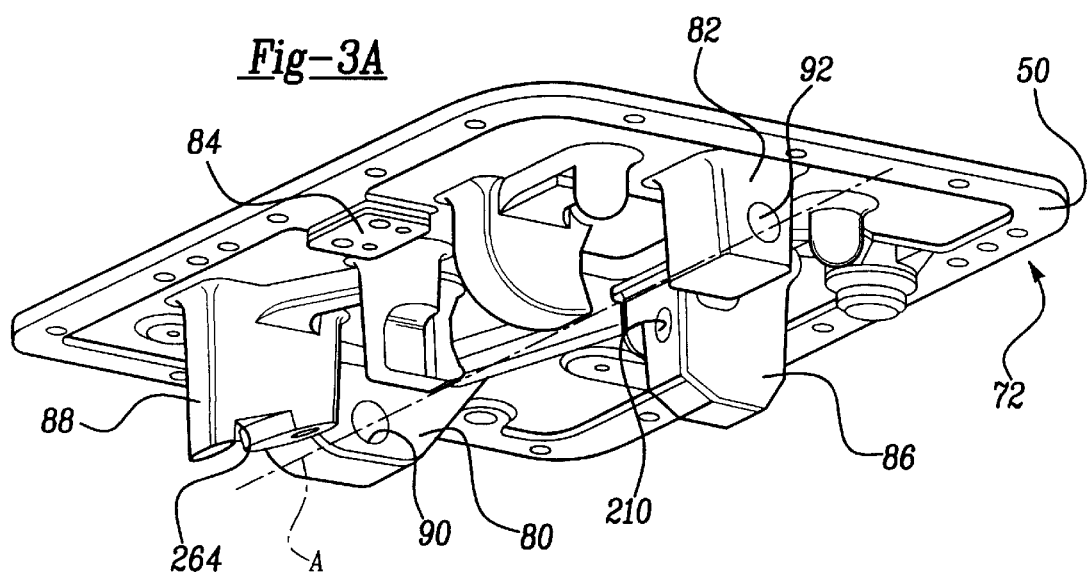
FIG. 3A is a perspective view of the top cover shown in FIG. 1.

The top cover assembly 60 includes a top portion 62 that supports a shift lever housing 64 that houses the shift lever 34. The shift lever 34 has a first 66 and second 68 portion and a ball 70 disposed therebetween. The ball 70 is pivotally supported by the shift lever housing 64 such that when the first portion 66 is moved by the vehicle operator in one direction, the second portion 68 moves in the opposing direction. As best shown in FIGS. 3A—3C, the top cover 50 has a bottom portion 72 that includes integral front 80 and rear 82 support members, an integral shift housing boss 84, an integral reverse bias housing 86, and an integral shift bar support 88. The top cover 50 also includes sensing device bosses 85,87 that each have an orifice 89.

Returning now to FIG. 2, the front 80 and rear 82 support members each have a cylindrical first 90 and second 92 bore, respectively, along an axis A. A cylindrical shift rail 96 is supported in the first 90 and second 92 bores of the front 80 and rear 82 support members and is permitted to rotate about and translate along axis A within the bores 90, 92.

As best shown in FIGS. 4A and 4B, a shift sleeve 98 is fixedly attached to the shift rail 96 by a fastener 100 so that the shift sleeve 98 moves with the shift rail 96. The shift sleeve 98 includes an arm 102 having an aperture 104 and a finger 106 oriented about 90 degrees from the arm 102. The shift finger 106 operatively and selectively engages the gears to cause a gearshift, as discussed below. The aperture 104 pivotally receives the second portion 68 of the shift lever 34 and permits the shift lever 34 to impart translational and rotational motion to the shift sleeve 98 and the attached shift rail 96. Thus, as the first portion 66 of the shift lever 34 is moved forward by the vehicle operator, the shift rail 96 is translated along axis A rearwardly. Conversely, as the first portion 66 of the shift lever 34 is moved rearward, the shift rail 96 is translated along axis A forwardly. When the first portion 66 is moved from side to side, the second portion 68 of the shift lever 34 causes the shift rail 96 to rotate in either direction about axis A.

Figure 2:
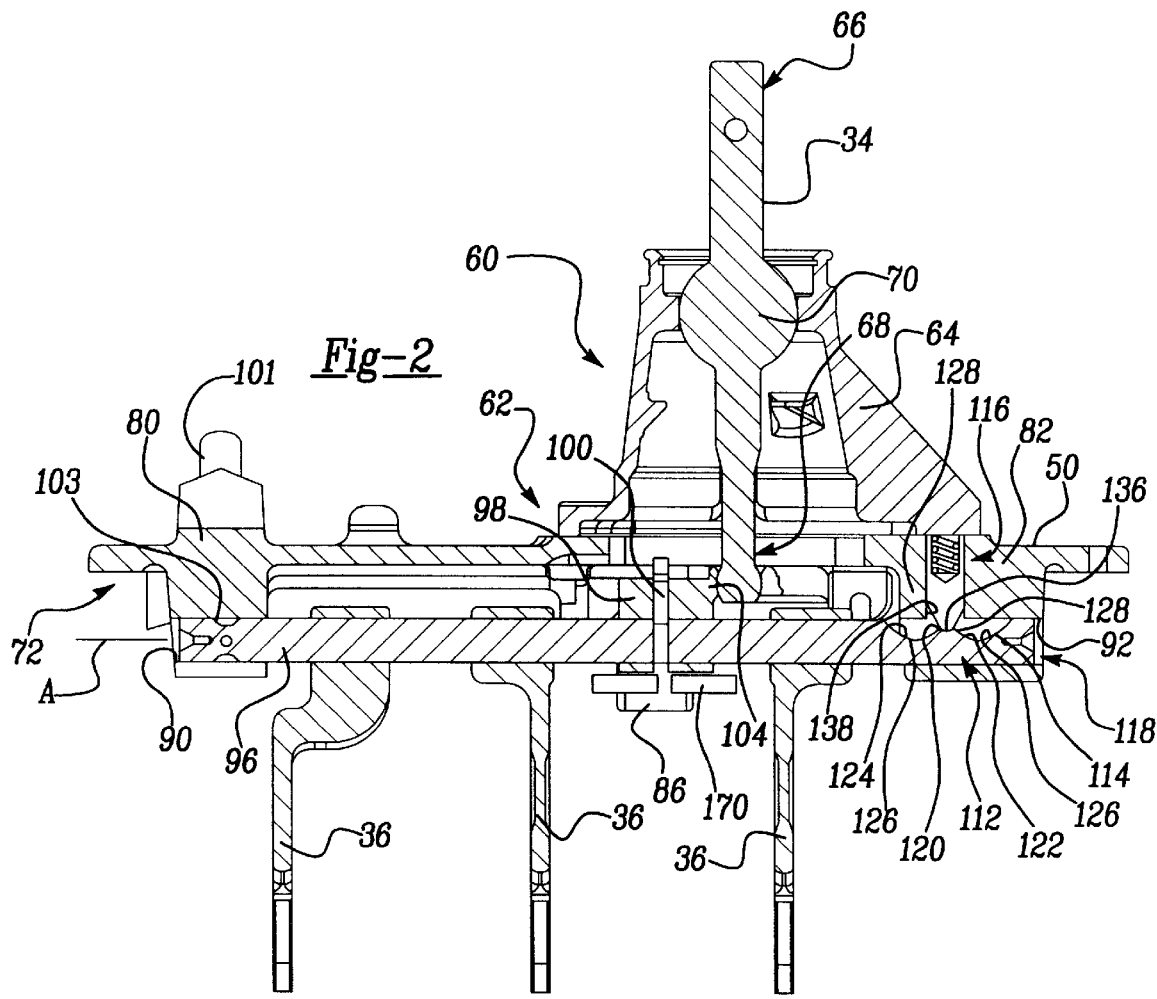
FIG. 2 is cross-sectional view of the top cover assembly shown in FIG. 1.

As mentioned above, it is important that the transmission is in a neutral position, that is, that the clutch collars 38 are disengaged from the main gears 20 when a range shift occurs. To achieve this end, the shift rail 96 has a contoured surface 103 within the bore 90, as best shown in FIG. 2. The contoured surface 103 is an annular groove that tapers toward the longitudinal axis A. Referring to FIG. 5, first and second sensing devices 101,105 are received in orifices 89 in the sensing device bosses 85,87, respectively. The first and second sensing devices are pin switches that include pins 107,109, respectively. Although pin switches are preferred, any suitable electronic signal producing device is acceptable.

The first and second sensing devices or electronic switches 101,105 produce first 111 and second 113 electronic signals, respectively, when the shift rail 96 is in a predetermined position, or neutral position. Again, the neutral position is considered be the position of the transmission components when the clutch collars are disengaged from the main gears. In the preferred embodiment, the neutral position correspond to the position where the pins 107,109 are seated fully in the contoured surface. When the shift rail is translated out of neutral, the pins 107,109 become unseated from the contoured surface 103 and no signals are sent. In this way, the electronic signals are then used to permit the range gears to be shifted safely, as discussed below.

During a shift from a low gear position in which the first portion 66 of the shift lever 34 is in the forward position, the first portion 66 is moved rearward and laterally into the neutral position. Once in the neutral position, i.e., the pins 107,109 seated in the contoured surface, the transmission 10 can utilize the high range by completing a range shift. The first electronic switch 101 sends the first electronic signal 111 and illuminates a neutral indicator light 115 in the vehicle cab. This indicates to the vehicle operator that it is safe to complete a range shift. The second electronic switch 105 is connected in series with a range switch 117. The range gear switch 117 is located on the shift lever in the vehicle cab. The range gear switch is manually activated by the vehicle operator and permits either the low or high gear to be preselected. Thus, when the range switch 117 is activated and the shift rail is positioned in neutral, a third electronic signal 123 is produced. The third electronic signal will not be produced unless both the range gear switch and second electronic switch are activated. The third electronic signal 123 is then sent to a range gear actuator 119 which shifts the transmission into either low or high range, depending upon the selection of the range gear switch, using the range gears 121. At this point the operator can shift into another gear.

It is to be understood that the first and second electronic signals can be utilized in an automatic range shifting system also. With an automatic system the need for a neutral indicator light is obviated. Further, the second signal may originate from a microprocessor that determines when to range shift based on any number of variables. Also it is possible that the function of the first and second electronic switches can be combined.

In another feature of the present invention, feed back is provided to the vehicle operator via where neutral is located on the shift pattern via the shift lever. More specifically, the shift lever is biased toward the neutral position when the shift lever is moved out of gear. The shift rail 96 has an end 118 with a contoured surface 114 that is confined within the rear support member 82. In the preferred embodiment, the contoured surface 114 includes first, second, and third grooves cut into the shift rail 96 transversely to axis A with the first groove 120 disposed between the second 122 and third 124 grooves. When the transmission 10 is in neutral, the detent pin 116 is in contact with the first groove 120. When the first portion 66 of the shift lever 34 is in the rearward position, the detent pin 116 contacts the forward or second groove 122. Likewise, when the first portion 66 of the shift lever 34 is in the forward position, the detent pin 116 is in contact with the forward or third groove 124.

The grooves 120,122,124 form valleys 126 that are parallel to one another. The grooves 120,122,124 also have edges on either side of the valleys 126 that intersect one another and form peaks 128. The first groove 120 is at a first distance from axis A and the second 122 and third 124 grooves are a second distance from axis A. The first distance is greater than the second distance. Said another way, when the contoured surface 114 is oriented in a upwardly facing position, as shown in FIG. 2, the first groove 120 is higher than the second 122 and third grooves 124.

The first support member 80 further includes an aperture 136 that terminates in an opening 138 within the first bore 90. The opening 138 is in alignment with the contoured surface 114. The aperture 136 houses the detent pin 116 that is spring loaded. The configuration of the contoured surface 114 and the force of the detent pin 116 provides a shift feel to the operator. As the detent pin 116 travels up one of the grooves during a shift, the shift effort increases until the detent pin 116 reaches a peak. Once the peak is crested, the shift effort decreases until the detent pin 116 becomes seated in a groove.

The spring loaded detent pin 116 exerts force against the contoured surface 114 during shifting and acts to center the shift lever 34 thereby biasing it into a rotationally neutral position. The valleys 126 of the grooves 120,122,124 are perpendicular to the force applied by the detent pin 116. As the shift rail 96 is rotated the detent pin 116 is forced upward and away from the axis A thereby causing the detent pin 116 to apply an increased force to the shift rail 96. This increase in force urges the shift rail 96 to a rotational neutral in which the grooves 120,122,124 are perpendicular to the detent pin.

As a result, when the detent pin 116 is seated within the first groove, or the second predetermined position, the shift rail and the shift lever, which is connected to the shift rail via the shift sleeve, are urged into a neutral position. The shift lever being in a centered neutral position corresponds to a first predetermined position. In this manner, the variation of the resistance during a gear shift provides feedback to the operator. It is to be understood that a different contoured surface 114 can be used other than the one disclosed as long as an adequate "shift feel" is maintained.

Figure 6A:
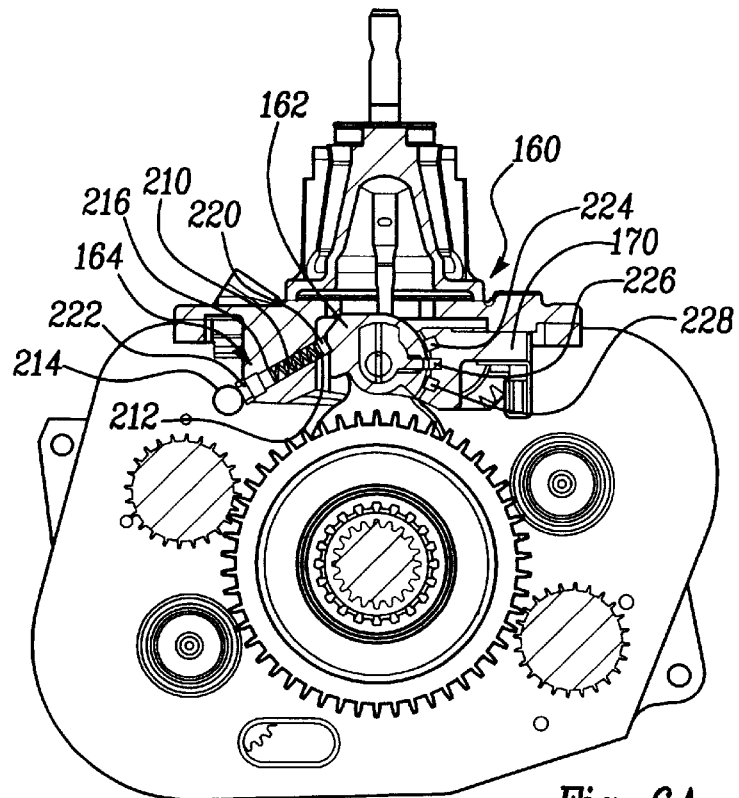
FIG. 6A is a cross-sectional view taken along line 6A—6A of FIG. 1 showing a reverse biasing mechanism.
Figure 6B:
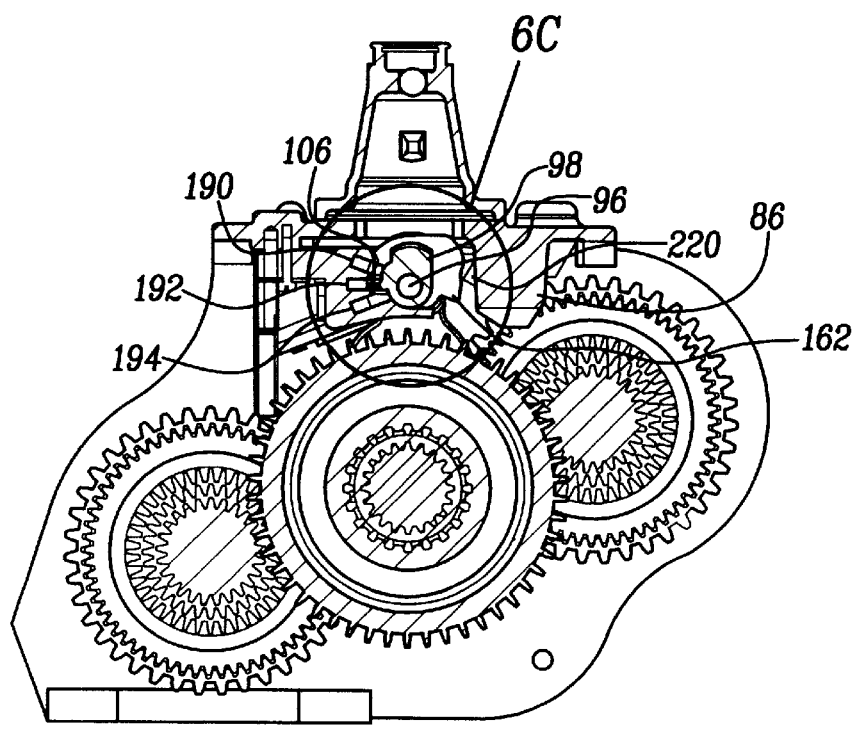
FIG. 6B is another cross-sectional view taken along line 6B—6B of FIG. 1 showing a reverse biasing mechanism.

In yet another aspect of the invention, the reverse biasing assembly 160 is best shown in FIGS. 6A and 6B and includes an interlock 162 and a detent 164. Known interlocks are used to lock out other gears while making a gear shift. The interlock of the present invention provides a dual function. The interlock 162 and detent 164 coact with one another to increase the resistance of the shift lever 34 when shifting into the reverse gear. The interlock 162 is slidably positioned about the shift sleeve 98 and rotates with the shift sleeve 98 when the shift lever 34 is moved from side to side.

Figure 7:
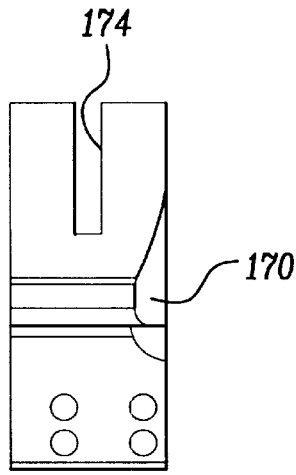
FIG. 7 is a bottom view of the shift housing shown in FIG. 6A.

A shift housing 170 is affixed to the shift housing boss 84 on the top cover 50 using a plurality of locating pins and fasteners (not shown). The shift housing 170 locates and laterally retains the interlock 162 within a vertical slot 174, which is shown in FIG. 7. During forward or rearward movement of the shift lever 34, the shift housing 170 acts to ground the interlock 162 to the top cover 50 and prevents the interlock 162 from moving along axis A. Thus, the interlock 162 is always in the same axial position and is only permitted to rotate about axis A.

The shift housing 170 also includes a pair of arms 176,178 that extend outwardly from an inner portion 180 of the shift housing 170. The arms 176,178 act as stops for the shift sleeve finger 106 and define the lateral boundaries of the shift lever 34. Disposed between the arms 176,178 are a plurality of channels 182,184,186 arranged angularly about the inner portion 180 of the shift housing 170. The channels 182,184,186 support a plurality of shift bars 190,192,194 used in moving the shift forks 36 during engagement and disengagement of the transmission gears.

Figure 6C:
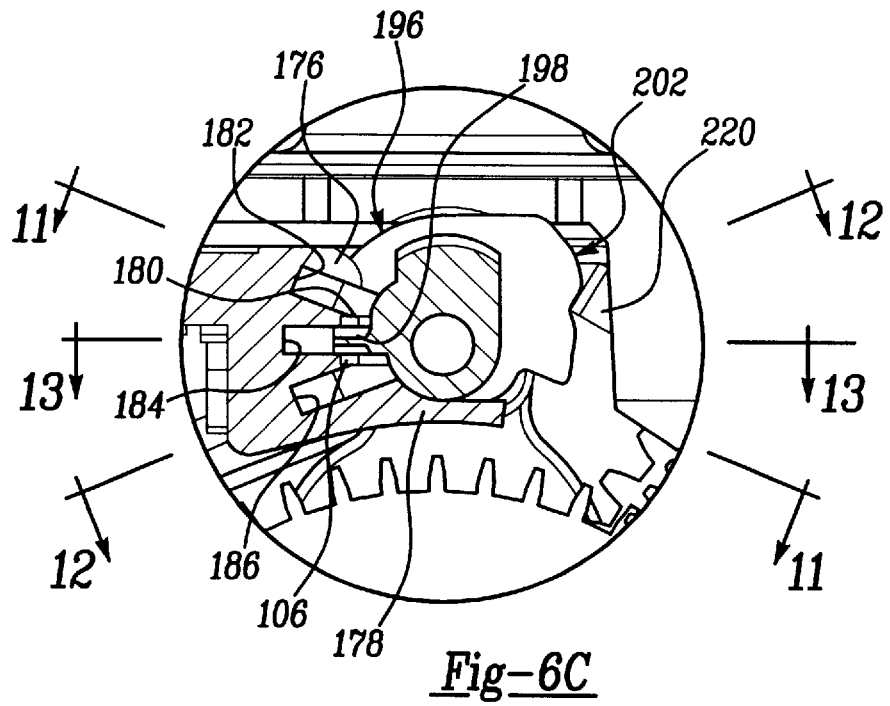
FIG. 6C is an enlarged view of circle 6C of FIG. 6B.
Figure 8:
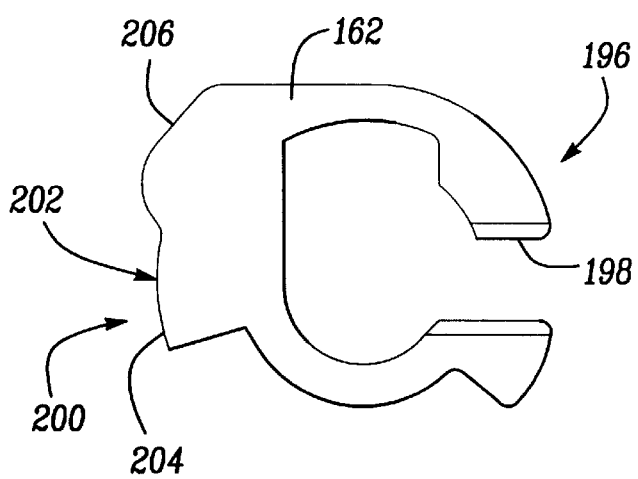
FIG. 8 is a front view of the interlock shown in FIG. 2.

The interlock 162 includes a first half 196 that has an aperture 198 with the finger 106 oriented within, shown in FIG. 6C. The first half 196 of the interlock 162 is used to lock out the other shift bars to prevent inadvertent shifting by the other shift bars, as discussed later in this application. The first half 196 provides the function typically associated with the interlock 162. Referring to FIG. 8, the interlock 162 also includes an opposing second half 200 integral with the first half 196. The second half 200 has a perimeter 202 with an arcuate surface 204 that is at a distant equal from axis A along its surface. On the perimeter 202 is a portion 206 adjacent to the arcuate surface 204 that forms a ramp. The portion 206 is farther from axis A than is the arcuate surface 204. Together the arcuate surface 204 and the portion 206 provide a first lower shift force and a higher shift force, respectively. As will be explained, the second half 200 provides a second function to the interlock thereby permitting components to be eliminated.

Returning now to FIGS. 6A–6C, the detent housing 86 of the top cover 50 includes a bore 210 that has a first 212 and second 214 opening and is positioned such that the first opening 212 is aligned with the second half 200. Contained within the bore 210 is a detent 164 which contacts and rides along the portion 206 and arcuate surface 204. The detent 164 includes a spring 216 and a pin 220 and a retaining screw 222. During assembly and with the interlock 162 in place, the spring 216 and pin 220 are inserted within the bore 210 with the pin 220 partially extending from the first opening 212 and contacting the arcuate surface 204 of the perimeter 202. The retaining screw 222 is fastened to the second end 214. Furthermore, the portion 206 is positioned such that the shift force increases when the first portion 66 of the shift lever 34 is moved laterally toward the reverse gear, as discussed subsequently.

In operation, when the first portion 66 of the shift lever 34 is moved laterally away from neutral in the shift pattern P and towards reverse, the detent 164 rides along the arcuate surface 204 and up the portion 206 causing an increased resistance in the shift lever 34. In this manner, the vehicle operator is alerted that the shift lever is being moved towards the reverse gear. The operator may then take care to avoid making a reverse gear shift while the transmission is in forward motion.

Figure 9:
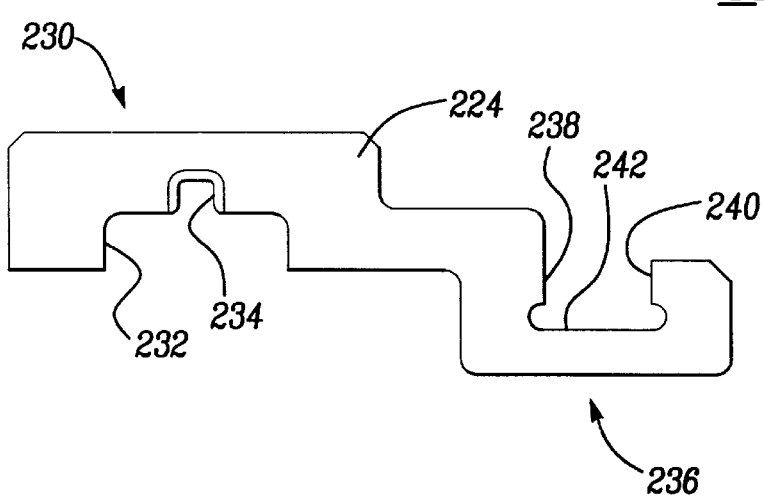
FIG. 9 is a side view of a shift bar.

It is desirable to connect the shift rail to the shift forks without using any fasteners to reduce the number of components and increase reliability and serviceability. This is accomplished in part by the configuration of the connections between the shift sleeve and the shift bars and the shift bars and the shift forks. As shown in FIGS. 6A–6C, the shift housing has a plurality of channels 182,184,186 the slidingly receive and retain the low 224, mid 226, and high 228 shift bars. Turning now to FIG. 9, the low shift bar 224, which has a rectangular cross-section, has a first end 230 that includes a recess 232 which has a notch 234. Returning to FIG. 6A–6C, the first end 230 of the shift bar 224 is supported within the rectangular channel 182 with the recess 232 oriented adjacent to the shift sleeve 98. Hence, there is no need for fasteners to support the first end 230 of the shift bar 224. The first half 196 of the interlock 162 is aligned with the notch 234 in the recess 232 and the shift sleeve finger 106 is adjacent to the recess 232 in the first end 230. The first ends of the remaining shift bars are structured similarly.

Figure 10A:
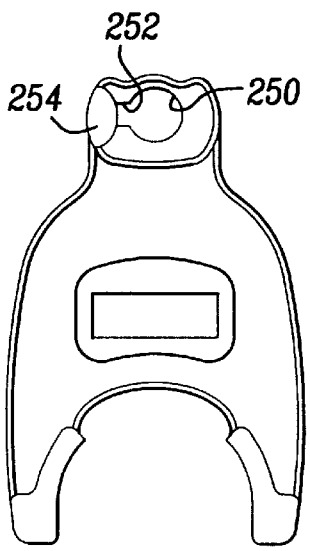
FIG. 10A is a front view of one of the shift forks shown in FIG. 2.
Figure 10B:
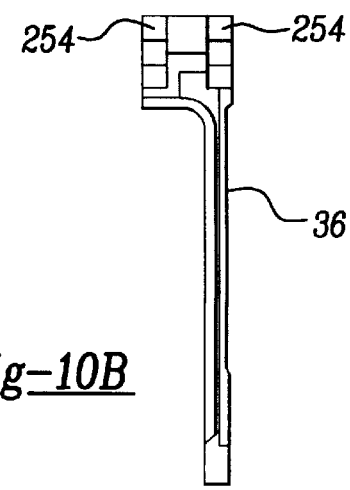
FIG. 10B is a side view of the shift fork shown in FIG. 10A.

The shift bar 224 further includes a second end 236 that has a pair of opposing ears 238,240 having edges that are parallel with one another. A recess 242 is disposed between the ears 238,240. Referring to FIGS. 10A and 10B, there is shown a low shift fork 36 with a hole 250 by which the shift fork 36 is slidably supported and a rectangular aperture 252 adjacent to the hole 250. The shift fork 36 is disposed between first 80 and second 82 support members. The shift fork 36 further includes a pair of opposing indentations 254 adjacent to the aperture 252. The second end 236 is inserted into the aperture 252 of the shift fork 236 with the ears 238,240 locking into the indentations 254. Thus, the second end 236 of the shift bar 224 is securely retained within the aperture 252 and is adjacent to the shift rail 96 thereby obviating the need for any fasteners.

Figure 11:
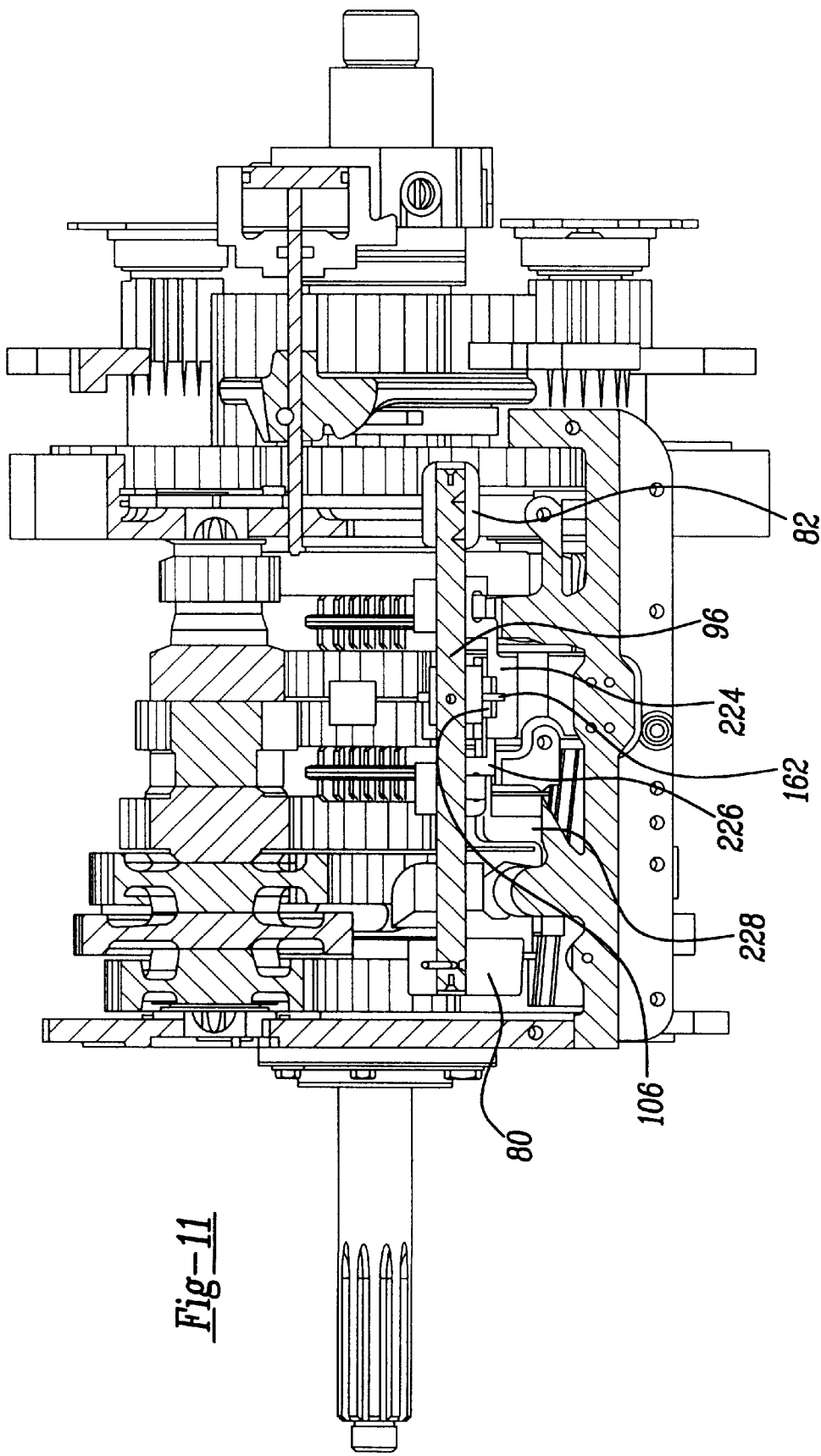
FIG. 11 is a cross-sectional view taken along line 11—11 of FIG. 6C showing a low gear shift.
Figure 12:
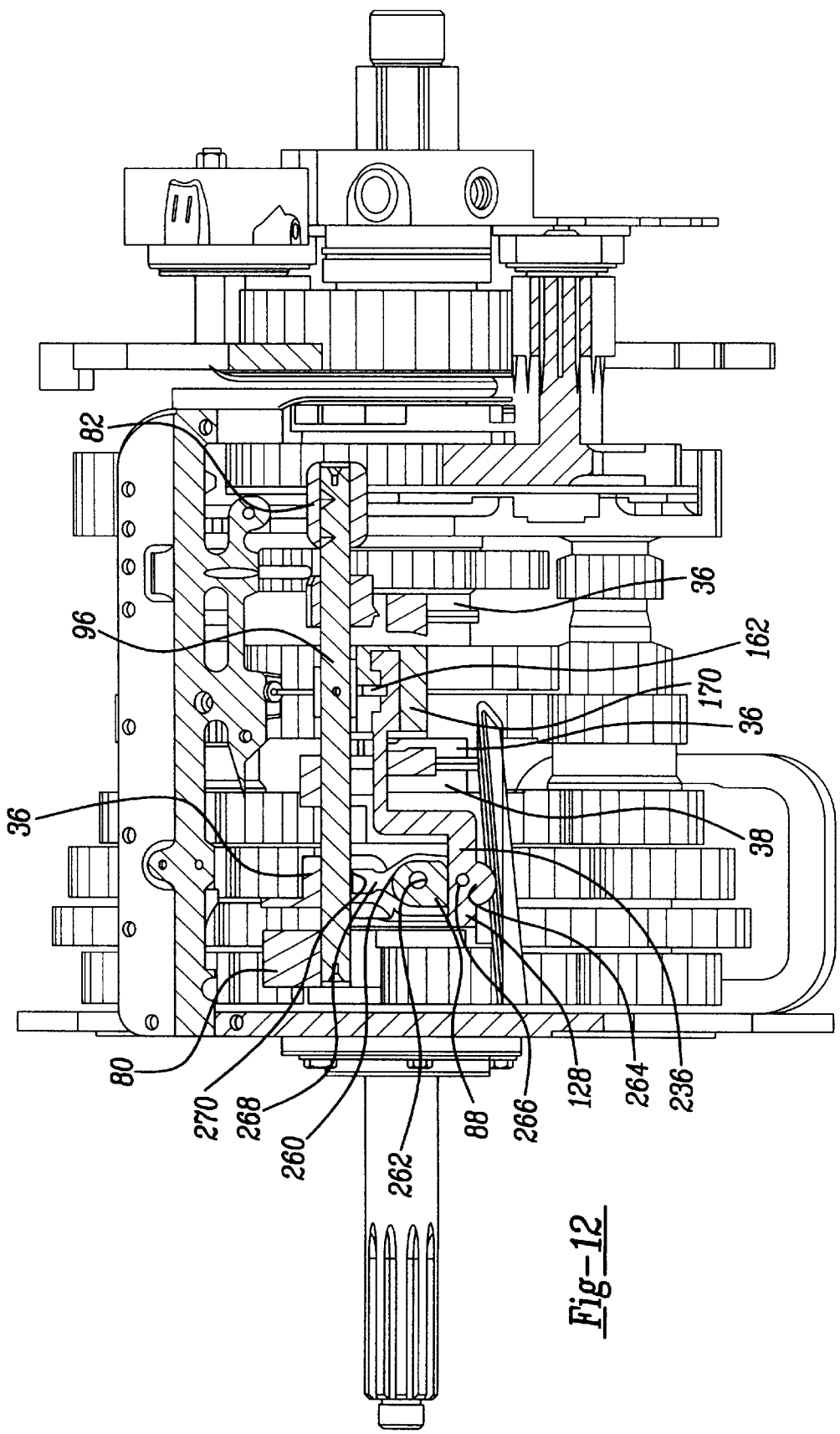
FIG. 12 is a cross-sectional view taken along line 12—12 of FIG. 6C showing a high gear shift.

As mentioned above the interlock 162 coacts with the shift bars 224,226,228 to prevent forward and rearward movement of more than one shift fork at a time and the finger 106 operates to selectively engage the recess in the first end in one of the shift bars. Reference will now be made to FIGS. 11 and 12 to illustrate how a shift is made for a mid gear shift.

For a gear shift that utilizes the mid shift bar 226 and fork 36, the low 224 and high 228 shift bars will be locked out by the interlock 162, as seen in FIGS. 11 and 12, respectively. More specifically, the first half 196 of the interlock 162 engages the notches 234 of each of the first ends 230 of the low 224 and high 228 shift bars. The vertical slot 174 in the shift housing 170 that receives the interlock 162 prevents the interlock 162 and hence the low 224 and high 228 shift bars from moving along the longitudinal axis A. In this manner, the low 224 and high 228 shift bars and their associated shift forks 36 are prevented from making a gear shift.

Figure 13:
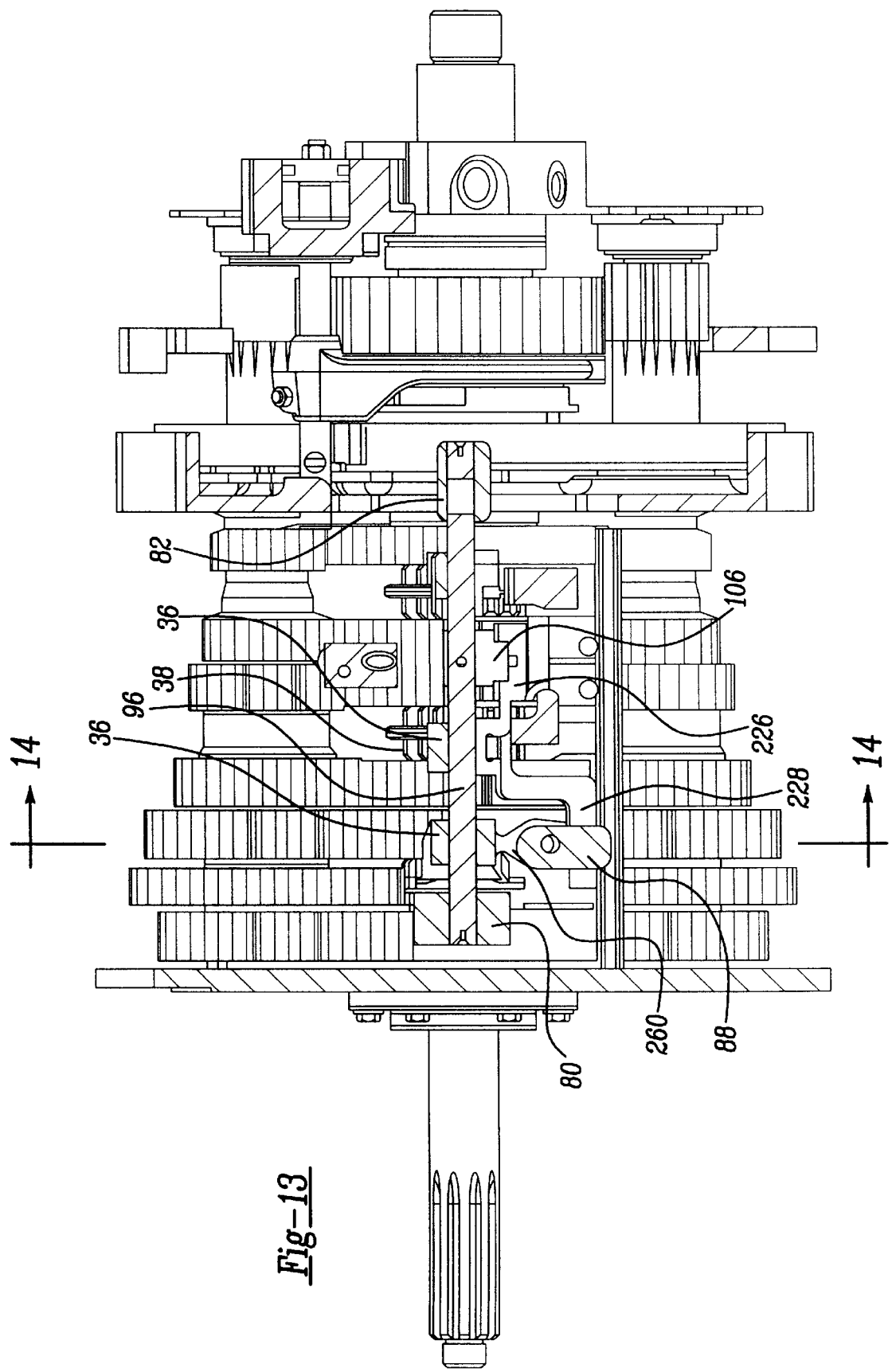
FIG. 13 is a cross-sectional view taken along line 13—13 of FIG. 6C showing a mid gear shift.

Turning now to FIG. 13, the finger 106 of the shift sleeve 98 is engaged with the recess 232 of the mid shift bar 226. In this position, if the first portion 66 of the shift lever 34 is moved rearward, the mid shift bar 226 will move forward in its respective channel 182 in the shift housing 170. The mid shift fork 36 will move the clutch collar 38 forward into engagement with a gear thereby causing a gear shift. Conversely, if the first portion 66 of the shift lever 34 is moved forward, the shift fork 36 and clutch collar 38 will move rearward into engagement with a gear.

To make a gear shift utilizing a low 224 or high 228 shift bar and their associated gears the shift lever is moved laterally such that the finger 106 on the shift sleeve 98 is aligned with the recess 232 of the desired shift bar. The remaining shift bars will be locked out, or prevented from moving along the longitudinal axis A, by the interlock 162. The shift lever 34 may then be moved forward or rearward to cause a gear shift.

Figure 14:
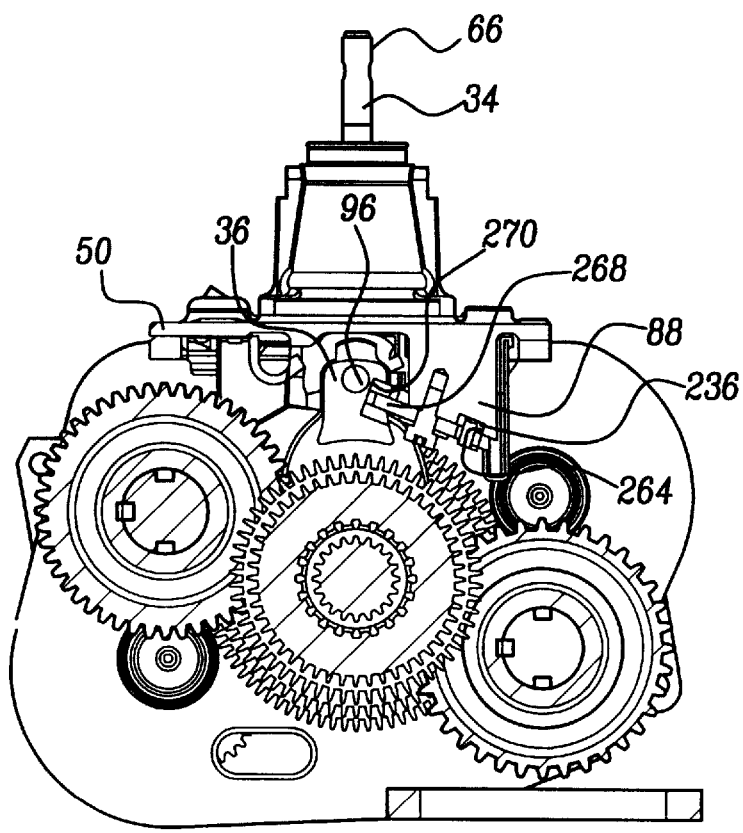
FIG. 14 is a cross-sectional view taken along line 14—14 of FIG. 13 showing the interaction of the high shift bar with the high shift fork.

The manner in which the high shift bar 228 is connected to the high shift fork 36 differs from that of the low and mid shift bars and forks. The top cover assembly 60 includes a rocking lever 260 pivotally attached by a first hole 262 to the shift bar support 88, as shown in FIG. 12. The shift bar support 88 has a groove 264 that slidingly receives the second end 236 of the high shift bar 228. The rocking lever 260 further includes a second hole 266 to which the second end 236 of the high shift bar 228 pivotally attaches. Referring now to FIG. 14, the rocking lever 260 has an appendage 268 that is received in a cavity 270 in the high shift fork 36. In operation, the shift lever 34 is moved through the shift pattern P such that the shift sleeve finger 106 is rotated into engagement with the recess 232 in the first end 230 of the high shift bar 228. When the shift finger 106 is translated within the channel 186, the second end 236 of the high shift bar 228 slides in the shift bar support groove 264 thereby pivoting the appendage 268 of the rocking lever 260 forward or rearward. In this manner, the appendage 268 moves the high shift fork 36 and forces a clutch collar 38 into engagement with a gear resulting in a gear shift.

The invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A manual transmission assembly comprising:
   a plurality of gears including forward gears and a reverse gear;
   a shift lever for shifting said gears, said shift lever having a first lower shift force when moved to shift at least one of the forward gears;
   a shift rail operatively connected to said shift lever, said shift rail defining a longitudinal axis of rotation about which said shift rail rotates when said shift lever is moved to shift said gears;
   an interlock supported by said shift rail, said interlock rotating with said shift rail; and
   a detent that engages said interlock for creating a higher shift force than said first lower shift force when said shift lever is moved to shift said reverse gear.

2. The assembly as set forth in claim 1 wherein said interlock further includes a perimeter having a portion for engaging said detent and creating said higher shift force.

3. The assembly as set forth in claim 2 further including an arcuate surface adjacent to said portion for engaging said detent when said shift lever has said first lower shift force, said arcuate surface being a distance from said longitudinal axis and said portion being farther from said longitudinal axis than said distance.

4. The assembly as set forth in claim 1 further including a shift sleeve for shifting said gears, said shift sleeve disposed between said shift rail and said interlock and being operatively connected to said shift lever and fixedly attached to said shift rail.

5. The assembly as set forth in claim 1 wherein, said shift lever includes a first predetermined position, said shift rail includes
   a contoured surface formed in said outer cylindrical surface for defining said plurality of shift positions including a second predetermined position, and said assembly further comprises
      a detent pin for applying a force to said contoured surface and urging said shift rail into said second predetermined position and said shift lever into said first predetermined position.

6. The assembly as set forth in claim 5 wherein said contoured surface is perpendicular to said force.

7. The assembly as set forth in claim 6 further including a neutral position in which none of said plurality of gears are engaged wherein said neutral position is said first predetermined position of said shift lever and said second predetermined shift position of said contoured surface.

8. The assembly as set forth in claim 7 wherein said contoured surface further includes a plurality of grooves arranged transversely to said longitudinal axis on said shift rail for defining said plurality of shift positions, said grooves intersecting one another thereby forming peaks.

9. The assembly as set forth in claim 8 wherein said plurality of grooves is comprised of a first, second, and third groove, said first groove being disposed between said second and third grooves and wherein said first groove is said second predetermined position.

10. The assembly as set forth in claim 9 further including a first and second distance wherein said first groove is located at a first distance from said longitudinal axis and said second and third grooves each are located said second distance from said longitudinal axis, said first distance being greater than said second distance.

11. The assembly as set forth in claim 1 wherein said detent includes a pin for engaging said engagement portion and a spring for biasing said pin into engagement with said portion and creating said higher shift force.

12. The assembly as set forth in claim 11 further including a housing having a bore for receiving said spring and pin, said bore including an opening being aligned with said portion, said opening permitting said pin to partially extend from said opening and engage said portion.

13. A manual transmission assembly comprising:
   a plurality of gears;
   a shift lever for shifting amongst said gears;
   a shift housing having a channel;
   a shift fork spaced from said shift housing for engaging said plurality of gears, said shift fork being selectively engageable by said shift lever; and
   a shift bar for interconnecting said shift lever and said shift fork, said shift bar being in sliding engagement with said channel such that when said shift lever actuates said shift bar, said shift bar moves along said channel causing said shift fork to engage and shift into a desired gear.

14. The assembly as set forth in claim 13 further including a housing and a shift rail supported by said housing and operatively connected to said shift lever, said shift rail having a longitudinal axis and said shift rail being proximate to and parallel with said channel, said shift rail being selectively engageable with said shift bar such that when said shift lever rotates said shift rail about said longitudinal axis and into engagement with said shift bar and when said shift rail is translated, said shift bar moves along said channel causing said shift fork to engage and shift into a desired gear.

15. The assembly as set forth in claim 14 wherein said shift bar further includes a first end, said shift rail being operatively selectively engageable with said first end, said first end being supported by and slidably mated with said channel such that when said shift lever rotates said shift rail about said longitudinal axis and into engagement with said first end and when said shift rail is translated, said first end moves along said channel causing said shift fork to engage and shift into a desired gear.

16. The assembly as set forth in claim 15 further including a shift sleeve coaxial with and affixed to said shift rail, said shift lever operatively connected to said shift sleeve, said shift sleeve having a finger, said first end including a recess for receiving said finger such that when said shift lever rotates said shift sleeve about said longitudinal axis and said finger engages said recess and when said shift sleeve is subsequently translated, said first end moves along said channel causing said shift fork to engage and shift into a desired gear.

17. The assembly as set forth in claim 14 wherein the number of said shift bars, said shift forks, and said channels is three, and the number of said shift rails is one.

18. The assembly as set forth in claim 17 further including an interlock, said shift housing including a slot transverse to said channels, and said first end of said shift bars further including a notch, said interlock being coaxial with said shift rail and disposed about said shift sleeve, said interlock having an aperture aligned with said finger, such that when said finger is rotated into engagement with said recess of said first end of one of said shift bars and said interlock is disposed in said notch of each of the two remaining shift bars such that said two remaining shift bars are prevented from being translated when said one of said shift bars is translated during a gear shift.

19. The assembly as set forth in claim 14 wherein said shift fork further includes a hole by which said shift fork is supported on said shift rail.

20. The assembly as set forth in claim 19 wherein said shift fork further includes an aperture adjacent said hole and said shift bar further includes a second end, said second end being retained by and operationally attached to said aperture, such that when said first end is translated in said channel by said shift lever during a gear shift causing said shift fork to translate along said longitudinal axis and engage and shift into a desired gear.

* * * * *